(No Model.)

G. MORSE.
HITCHING DEVICE FOR VEHICLES.

No. 315,816. Patented Apr. 14, 1885.

Witnesses.
H. Brown.
A. L. White.

Inventor
Geo. Morse
by Might & Brown
Attys

UNITED STATES PATENT OFFICE.

GEORGE MORSE, OF GLOUCESTER, MASSACHUSETTS.

HITCHING DEVICE FOR VEHICLES.

SPECIFICATION forming part of Letters Patent No. 315,816, dated April 14, 1885.

Application filed July 19, 1884. (No model.)

*To all whom it may concern:*

Be it known that I, GEORGE MORSE, of Gloucester, in the county of Essex and State of Massachusetts, have invented certain Improvements in Hitching Devices, of which the following is a specification.

This invention relates to horse-hitching devices adapted to be applied to a wheel-hub, and to wind up and thus tighten a hitching-strap applied thereto, if the horse moves forward, but slips loosely without tightening the strap when the horse backs, so that a backing movement will not cause the strap to pull the horse backwardly.

The invention consists in certain improvements in the construction of devices of this class, which I will now proceed to describe and claim.

Figure 1:
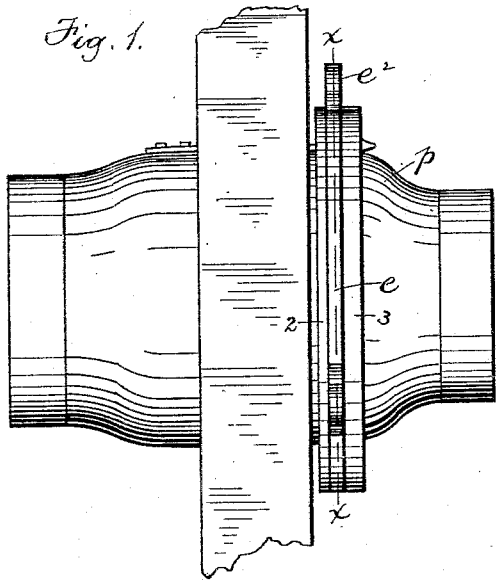
Figure 2:
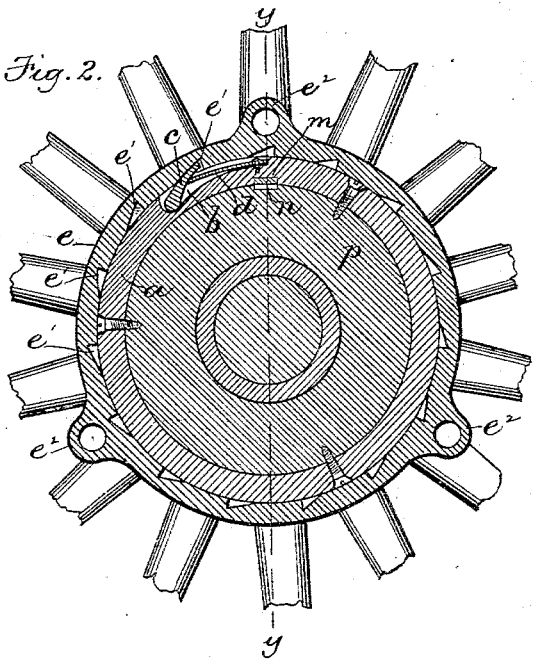
Figure 3:
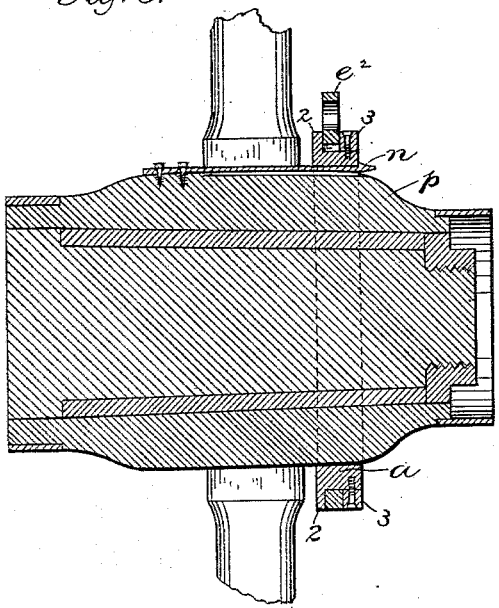

Of the accompanying drawings, forming a part of this specification, Figure 1 represents an edge view of a portion of a wheel showing the hub and my improved hitching device applied thereto. Fig. 2 represents a section on line $x\,x$, Fig. 1. Fig. 3 represents a section on line $y\,y$, Fig. 2.

The same letters of reference indicate the same parts in all the figures.

In the drawings, $a$ represents a band adapted to encircle a wheel-hub, and provided at its edges with flanges 2 3, the former being preferably a part of the band, while the latter is a separate ring screwed to the band. The periphery of the band $a$ between said flanges has a depression or recess, $b$, in which is inserted a dog, $c$, and a spring, $d$, adapted to press the dog outwardly. The spring is riveted to the band, and the dog is placed loosely in the deeper end of the recess and turns therein, as if it were connected to the band by a pivot.

$e$ represents a ring or band fitting closely on the periphery of the band $a$ and filling the space between the flanges 2 3, said band $e$ being placed on the band $a$ before the flange $3$ is applied. The band $e$ is provided with a series of notches, $e'$, so formed that the dog $c$, moving with the wheel-hub when the vehicle is backing, will slip on the notched surface, but when the vehicle is moving in the opposite direction will engage with the first notch it meets, and thus cause the band $e$ to rotate with the wheel. The band $e$ is provided with one or more perforated ears, $e^2$, adapted to receive a snap-hook on a hitching-strap. It will be seen, therefore, that when the band $a$ is secured to a wheel and the hitching-strap is secured to the band $e$ the forward motion of the vehicle will cause the notched band $e$ to rotate and wind up the hitching-strap, and thus check the forward motion of the horse; but when the vehicle is moved backwardly the dog will slip without rotating the band, so that the strap will not be wound up and caused to pull backwardly if the horse backs.

The band $a$ may be permanently secured to the hub by screws passing through its center portion or through offset-ears. In some cases I deem it preferable to secure the band detachably, so that it can be applied to and removed from the hub at pleasure. To this end the inner surface of the band may be provided with a slot, $m$, to receive a spring-catch, $n$, secured to the hub $p$, and adapted to spring outwardly into said slot, and thereby prevent the band from rotating on the hub and from slipping off sidewise, the spring having preferably a slight barb or projection adapted to bear against the outer side of the flange, next the outer end of the hub.

It will be seen that the described device constitutes a simple, efficient, and compact hitching device, the rubbing parts of which are protected from dust, mud, &c., by the close fit of the band $e$ against the band $a$ and between the flanges of the latter.

I am aware that devices operating on a similar general principle are not new, and I do not therefore claim, broadly, a hitching device adapted to be operated only by the forward rotation of the wheel. The ring $e$ in this case practically fills the groove in the hub-band and covers the spring-pawl, so that the pawl and notches in the ring are protected against dust and mud.

I claim—

1. In a horse-hitching device, the combination of the grooved band on the wheel, having a spring-pawl in a recess below the general level of the groove, and a ring, $e$, notched on its inner periphery and filling the groove in the wheel-band said ring $e$ provided with one or more loops to which a strap may be attached, substantially as described.

2. The combination of the band $e$, adapted to be connected with a hitching-strap, the band *a*, supporting the band *e*, and having a slot, *m*, in its inner surface, and the wheel-hub having a spring-catch, *n*, adapted to enter said slot and thereby secure the band to the hub, as set forth.

In testimony whereof I have signed my name to this specification in the presence of two subscribing witnesses.

GEORGE MORSE.

Witnesses:
FRANK E. SMOTHEN,
CYRUS STORY.